United States Patent [19]

Livingston

[11] 4,036,346

[45] July 19, 1977

[54] COIN OPERATED VACUUM APPARATUS

[76] Inventor: Richard W. Livingston, 10100 Raytown Road, Kansas City, Mo. 64134

[21] Appl. No.: 690,897

[22] Filed: May 28, 1976

[51] Int. Cl.² .............................................. A47L 5/00
[52] U.S. Cl. ................................. 194/9 T; 15/300 A; 15/327 D; 15/339
[58] Field of Search ............ 194/9 T; 15/300 A, 301, 15/312 A, 327 D, 339, 412, 352, 347

[56] References Cited

U.S. PATENT DOCUMENTS

| 1,853,960 | 4/1932  | Cunningham | 194/9 T    |
| 2,719,596 | 10/1955 | Kent et al. | 15/300 A   |
| 2,719,596 | 10/1955 | Kent et al. | 15/347 X   |
| 3,046,718 | 7/1962  | Ide et al.  | 15/347 X   |
| 3,063,082 | 11/1962 | Rosenberg  | 15/353     |

Primary Examiner—Allen N. Knowles
Attorney, Agent, or Firm—Phillip A. Rein

[57] ABSTRACT

This invention is a coin operated vacuum apparatus including a housing means mounted on basic support means; a vacuum power means enclosed by the housing means; a coin control means connected to the vacuum power means to control operation thereof; and a hose assembly connected to the vacuum power means. The housing means is constructed of fiberglass material having a cover head assembly and a removable receptacle assembly to receive refuse material therein. The vacuum power means includes a filter and motor assembly having a pair of vacuum motor members mounted on a motor head support assembly with the entire unit easily removable for maintenance purposes. The filter and motor assembly includes a filter assembly associated with each vacuum motor member to provide efficient filtration. The coin control means includes a time meter assembly to be actuated by a coin for a predetermined time period to energize the vacuum power means.

12 Claims, 8 Drawing Figures

COIN OPERATED VACUUM APPARATUS

Numerous types of coin operated vacuum assemblies are known in the prior art used in self service type car washes. The prior art vacuums are limited in suction and require substantial maintenance to keep in top running condition. None of the prior art vacuums utilize an efficient filter system to keep dust particles away from the vacuum motor to increase life thereof.

In one preferred embodiment of this invention, a coin operated vacuum apparatus is provided including a housing means mounted on a basic support means; a vacuum power means enclosed by the housing means; a coin control means secured to the housing means and operably connected to the vacuum power means; and a hose assembly connected to the vacuum power means. The housing means includes a cover head assembly pivotally connected to the basic support means and a receptacle assembly slidably and removably connected to the basic support means. The vacuum power means includes a motor head support assembly having a filter and motor assembly connected thereto. The filter and motor assembly includes a pair of vacuum motor members, each associated with a filter assembly which keeps all dust particles from reaching the respective vacuum motor members. Each filter assembly is easy to remove and clean when needed. The coin control means includes a time meter assembly to accept coins and deposit them into a coin box member. The hose assembly includes an elongated hose member connected at one end to the receptable assembly and having a nozzle member on the other end. When the coin operated vacuum apparatus is used unattended, an optional lock bolt assembly is available to anchor the cover head assembly and receptacle assemblly to the basic support means and also secure the coin control means against theft.

One object of this invention is to provide a coin operated vacuum apparatus constructed of molded fiberglass material being sturdy in construction, never requiring any painting, and substantially maintenance free.

Another object of this invention is to provide a coin operated vacuum apparatus having a hinged cover head assembly for ease of maintenance and a receptacle assembly that is removable to empty refuse material therefrom.

Still, another object of this invention is to provide a coin operated vacuum apparatus having dual filters and motor members with washable and re-usable filter elements.

One other object of this invention is to provide a coin operated vacuum apparatus having a vacuum power means that can be removed and replaced in a matter of seconds to maintain continuous operation.

One further object of this invention is to provide a coin operated vacuum apparatus havin a unique vacuum power means with a filter and motor assembly operable to keep all dust particles away from the motor members for prolonged motor life.

Still, one further object of this invention is to provide a coin operated vacuum apparatus that is reliable in operation, sturdy in construction, attractive in appearance, and requiring a minimum of maintenance.

Various other objects, advantages, and features of the invention will become apparent to those skilled in the art from the following discussion, taken in conjunction with the accompanying drawings, in which.

Figures 1, 2:
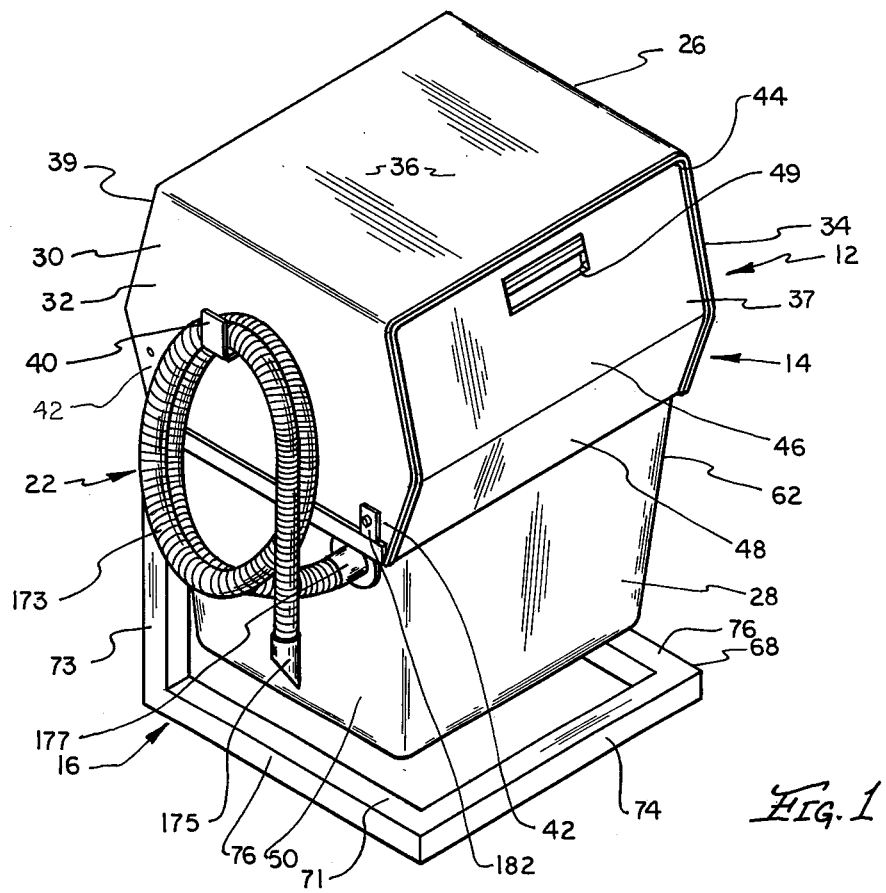
FIG. 1 is a perspective view of the coin operated vacuum apparatus of this invention.
FIG. 2 is a side elevational view of the coin operated vacuum apparatus of this invention having portions broken away for clarity.

The following is a discussion and description of preferred specific embodiments of the new coin operated vacuum apparatus of this invention, such being made with reference to the drawings, whereupon the same reference numerals are used to indicate the same or similar parts and/or structure. It is to be understood that such discussion and description is not to unduly limit the scope of the invention.

Referring to the drawings in detail and more particularly to FIG. 1, a coin operated vacuum apparatus of this invention, indicated generally at 12, includes 1) a housing means 14 connected to a basic support means 16; 2) a vacuum power means 18 mounted within the housing means 14; 3) a coin control means 20 connected to the housing means 14 and a power source; 4) a hose assembly 22 connected to the vacuum power means 18; and 5) an optional lock bolt assembly 24.

As best shown in FIGS. 1 and 2, the housing means 14 includes a cover head assembly 26 and a receptacle assembly 28. The cover head assembly 26 has an irregular shaped main body 30 consisting of vertical sidewalls 32, 34; a horizontal top wall 36; an inclined front wall 37; and an inclined back wall 39. The sidewall 32 has an L-shaped hose hanger hook 40 and both sidewalls 32, 34 are provided with front and back connector sections 42 having a hole 43 therein for reasons to be explained.

The inclined front wall 37 has a protective edge member 44 about its periphery and includes an upper section 46 integral with a lower section 48. The upper section 46 is provided with a grip indentation 49 to be grasped by one's hand to raise to the open position for reasons to become obvious.

The inclined back wall 39 is of a similar shape and inclination as the upper section 46 and the lower section 48 of the front wall 37.

The receptacle assembly 28 resembles a trash can member having a refuse canister member 50 of rectangular, box shape. The canister member 50 includes an upper, horizontal support rim 52 extended about an upper opening 54. The canister member 50 includes a bottom wall 56 integral with inclined sidewalls 57, 59 and end walls 60, 62 which, in turn, are integral with the support rim 52. The end wall 60 is formed with a hose connector member 64 mounted about an inlet opening 66. This is the entrance to carry air and refuse material into the receptacle assembly 28 as will be explained.

Figure 5:
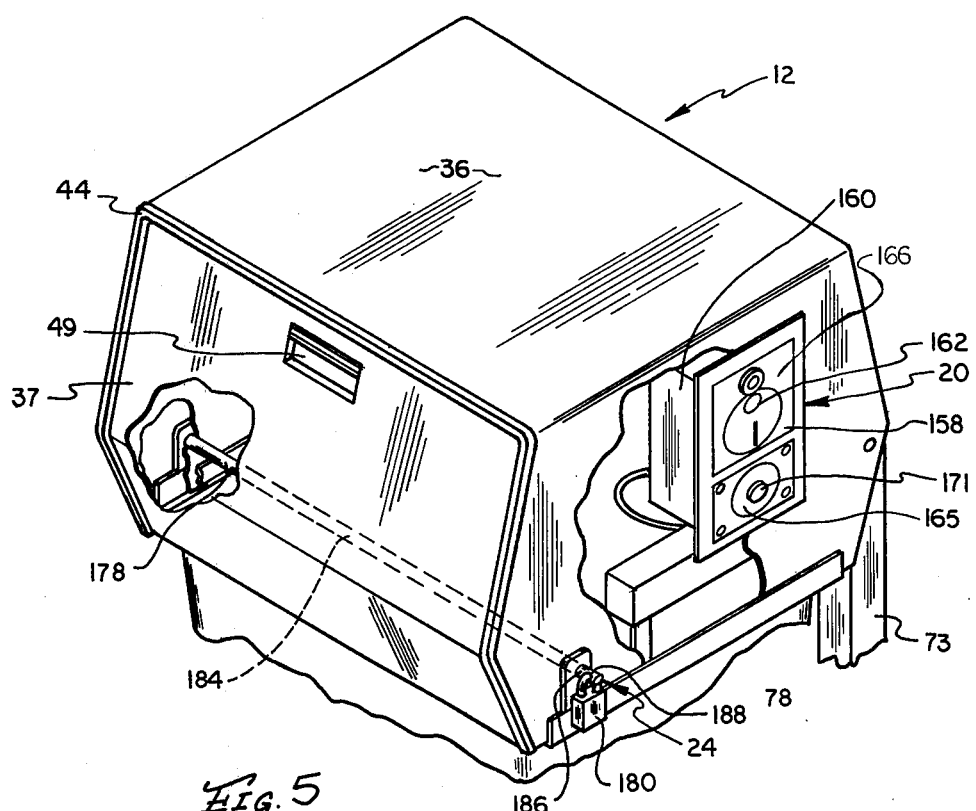
FIG. 5 is a fragmentary perspective view of the coin operated vacuum apparatus of this invention having portions broken away for clarity.

As noted in FIGS. 1 and 5, the basic support means 16 includes an L-shaped frame assembly 68 secured to a housing support frame 70. The frame assembly 68 is constructed of square tubing having a U-shaped base member 71 integral with vertical support legs 73. The base member 71 includes a front leg member 74 connected at opposite ends to parallel side leg members 76.

The housing support frame 70 includes upper parallel support arms 77 secured at one end to respective support legs 73 and at the outer ends by connector lugs 78 to a canister support assembly 80 and a head support assembly 82. The junction of the support legs 73 and support arms 77 are formed with a hole 84 to receive a bolt member 88 to pivotally connect the cover head assembly 26 thereto.

Figure 8:
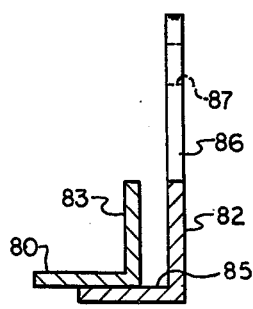
FIG. 8 is an enlarged sectional view taken along line 8—8 in FIG. 7.

The canister support assembly 80 as shown in FIG. 8 includes an inner angle member 83. The head support assembly 82 includes an outer angle member 85 secured to the angle member 83 and having a lock lug member 86 secured to an outer end thereof. The lock lug member 86 has a hole 87 in the outer end to receive a portion of the lock bolt assembly 24 as will be explained.

Figure 3:
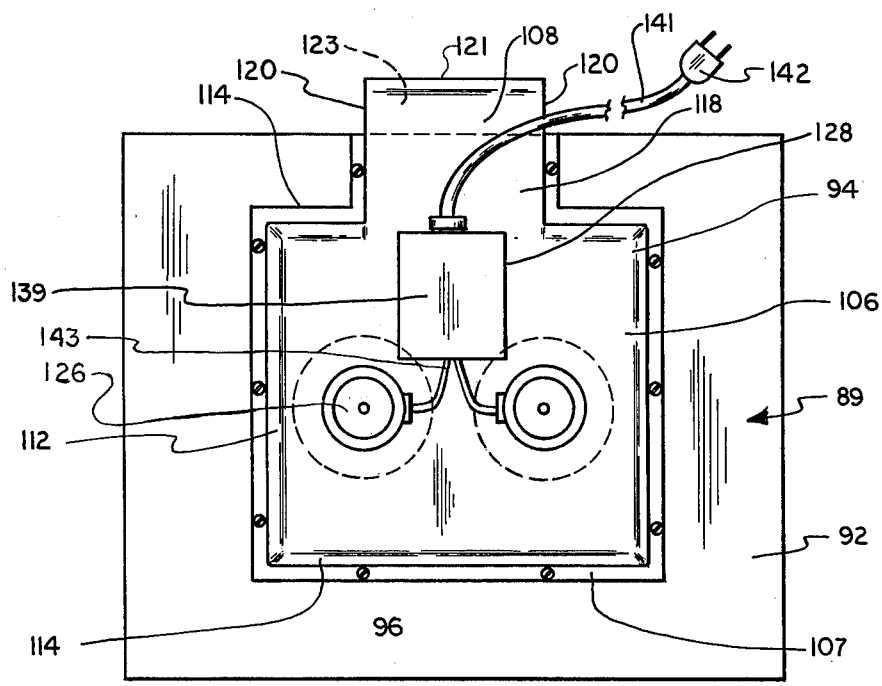
FIG. 3 is an enlarged top plan view of a vacuum power means of the coin operated vacuum apparatus of this invention.
Figure 4:
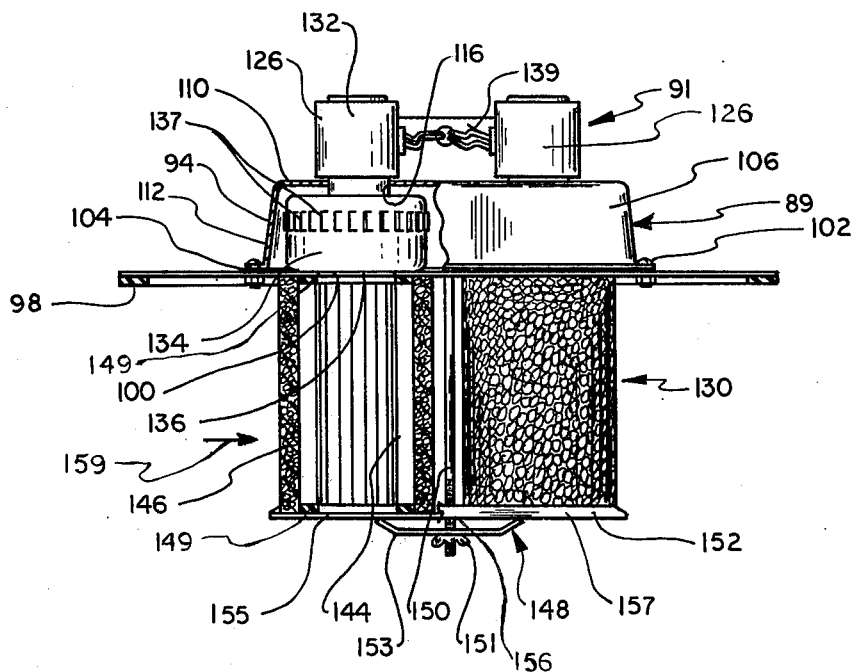
FIG. 4 is a side elevational view of the vacuum power means shown in FIG. 3 having portions broken away for clarity.

As shown in FIGS. 3 and 4, the vacuum power means 18 includes a motor head support assembly 89 having a filter and motor assembly 91 mounted thereon. The motor head support assembly 89 includes a motor support plate 92 having an air flow control cover 94 secured thereto. The motor support plate 92 has a main body 96 of rectangular shape with an air seal member 98 secured about its outer periphery. The main body 96 has a pair of adjacent openings 100 for reasons to become obvious.

As seen in FIG. 4, the air flow control cover 94 is secured by bolt members 102 to the motor support plate 92 with a seal member 104 therebetween. The control cover 94 is formed with a motor cover section 106 integral with an outlet air channel section 108. The motor cover section 106 is formed with a laterally extended rim section 107 and having a top wall 110, sidewalls 112, and end walls 114. The top wall 110 is formed with adjacent motor openings 116.

As best seen in FIG. 3, the outlet air channel section 108 is used to direct air outwardly of the motor support plate 92 and includes a top section 118, side sections 120, end section 121, and a discharge opening 123.

The filter and motor assembly 91 includes a pair of vacuum motor members 126, an electrical assembly 128 to provide power to the motor members 126, and a filter assembly 130 associated with each of the motor members 126. Each vacuum motor member 126 is provided with power section 132 connected to a blower section 134. Each motor member 126 is a conventional vacuum type with the blower section 134 formed with air inlet opening 136 and discharge openings 137.

The electrical assembly 128 includes a box member 139 connected to a cord member 141 having a plug-in member 142 on the outer end thereof to convey conventional 110 volt current thereto. Power is conveyed from the box member 139 by wires 143 to energize the motor members 126.

Referring to FIG. 4, the filter assembly 130 includes 1) an inner filter member 144; 2) an outer filter member 146; and 3) a filter support assembly 148. The inner filter member 144 is of cylindrical shape having upper and lower ring seals 149 and preferably constructed of a disposable paper element that can be easily and economically replaced. The outer filter member 146 is of cylindrical shape to fit closely about the inner filter member 144 and preferably constructed of a washable foam material that can be easily cleaned and re-used.

The filter support assembly 148 includes 1) a threaded support shaft 150 having one end secured to the motor support plate 92; 2) a wing nut 151 threaded on the outer end of the support shaft 150; 3) a filter support plate 152 mounted against the filter assembly 130; and 4) a bias plate 153 mounted against the filter support plate 152. The filter support plate 152 is formed with a main body portion 155 integral with an upright edge portion 157. As seen in FIG. 4, the filter support plate 152 and bias plate 153 are each formed with a central hole 156 to receive the support shaft 150 therethrough. The wing nut 151 is threaded on the support shaft 150 to clamp the filter assembly 30 against the motor support plate 92 to direct air through the outer filter member 146 as shown by an arrow 159.

Figure 6:
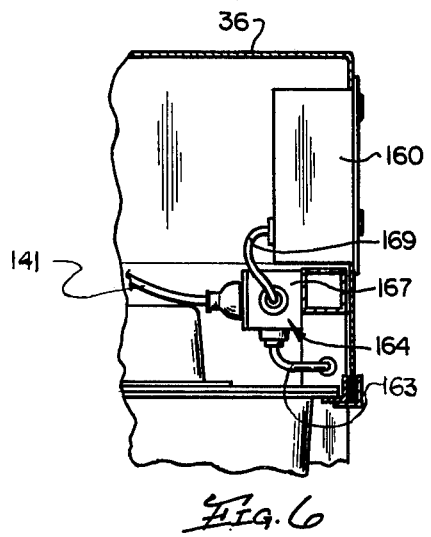
FIG. 6 is a fragmentary sectional view showing a coin control means of the coin operated vacuum apparatus of this invention.

As shown in FIGS. 5 and 6, the coin control means 20 includes a time member assembly 158 mounted within a timer housing member 160. The timer housing member 160 is secured as by bolt members to the cover head assembly 26. The time meter assembly 158 includes 1) a coin acceptor member 162 to receive coin members to actuate a timer member 166; 2) an electrical supply assembly 164 to transmit power from a 110 volt power source (cable 163) through the timer member 166 to the cord member 141 and motor members 126; and 3) a coin box member 165 to receive coins therein that pass through the coin acceptor member 162.

The electrical support assembly 164 includes a receptacle box 167 with a power cord 169 to supply power from cable 163 to the timer member 166 and back to the receptacle box 167 to energize the cord member 141 and motor members 126. The timer member 166 can be adjusted to operate a predetermined length of time for a certain coin. For example, 5 minutes for a quarter which is sufficient for vacuuming an automobile.

The coin box member 165 is provided with a lock member 171 to secure any coins therein.

As seen in FIG. 1, the hose assembly 22 includes 1) an elongated, flexible hose member 173; 2) a nozzle member 175 connected to an outer end of the hose member 173; and 3) a connector cuff 177 connected to the other end of the hose member 173 used to connect same to the hose connector member 64 on the receptacle assembly 28.

It is noted that the coin operated vacuum apparatus 12 could be used without the coin control means 20 and operated through an on-off switch. However, for use in unattended car wash operations, the lock bolt assembly 24 is needed to secure the housing means 14 in the closed condition. More particularly, the lock bolt assembly 24 includes a bolt member 178 secured in a locked condition by a padlock member 180.

The bolt member 178 includes a flattened head section 182 integral with one end of a shaft section 184. The other end of the shaft section 184 is formed with a connector section 186 having a hole 188 therein to receive the padlock member 180 therein.

In the use and operation of the coin operated vacuum apparatus 12, a quarter is first inserted into the coin acceptor member 162 to transfer power for the cable 163 to the motor members 126 for a predetermined time such as 5 minutes. A person uses the hose member 173 and the nozzle member 175 to clean the interior of a vehicle. The bolt member 178 is inserted through holes 43 and the holes 87 in the lock lug members 86. The padlock member 180 is secured to connector section 186 through hole 188 to secure the housing means 14 to the basic support means 16.

Figure 7:
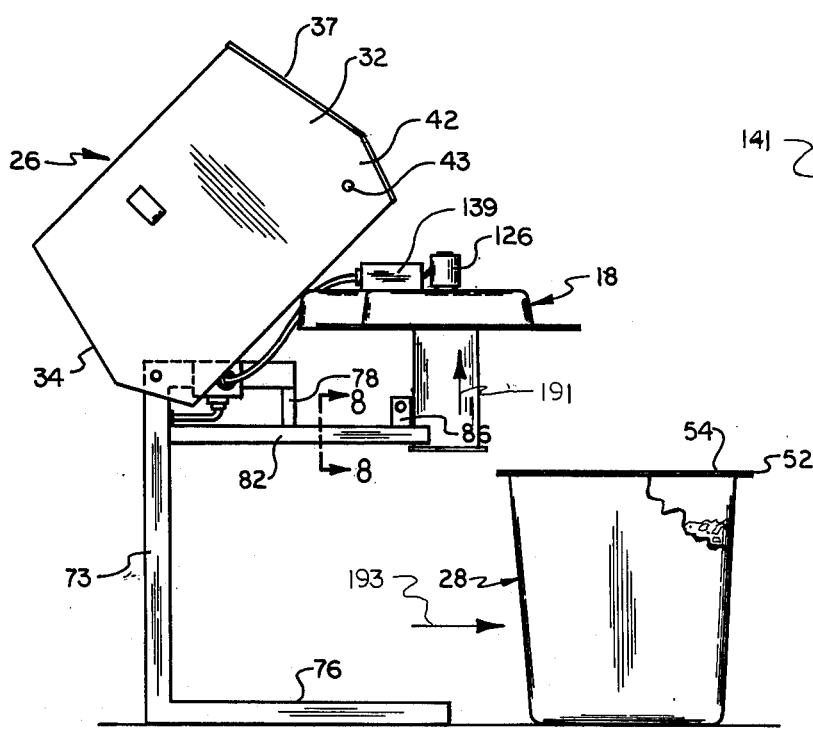
FIG. 7 is a side elevational view of the coin operated vacuum apparatus of this invention having elements in separated positions illustrating steps taken for maintenance purposes.

On servicing the coin operated vacuum apparatus 12 as shown in FIG. 2, the lock bolt assembly 24 is removed and the cover head assembly 26 is pivoted to the open position about bolt members 88. The vacuum power means 18 is movable upwardly as shown by arrow 191 in FIG. 7 and the receptacle assembly 28 is movable horizontally as shown by arrow 193. The refuse canister member 50 can then be emptied of trash therein.

Periodically the vacuum power means 18 is removed and the filter assembly 130 is disassembled. More particularly, the outer filter members 146 are removed and cleaned with a water spray. The inner filter members 144 are constructed of inexpensive paper and can be replaced as needed. Also, a spare vacuum power means 18 can be available to take the place of a a defective one when, for instance, a motor member 126 is defective. The cord member 141 and plug-in member 142 need only be removed from the receptacle box 167 and the replacement vacuum power means 18 inserted in its place. No clamps are required to hold the vacuum power means 18 against the support rim 52 of the refuse canister member 50 as the weight thereof and vacuum pressure provides the necessary seal.

The coin operated vacuum apparatus of this invention has a housing means constructed of long lasting, maintenance free, molded fiberglass which is attractive in appearance. The vacuum power means is designed to control inlet air through filter assembly, blower sections of the motor members, and through the discharge opening in the outlet air channel section. This keeps all dust particles from reaching the power sections of the motor members to greatly increase life thereof. Also, the filtration system used herein is of advanced design and easy to maintain. The refuse canister member is easily removed for emptying without requiring a shovel or other tools to do so.

While the invention has been described in conjunction with preferred specific embodiments thereof, it will be understood that this description is intended to illustrate and not to limit the scope of the invention, which is defined by the following claims.

I claim:

1. A vacuum apparatus generally used in vehicle cleaning operations, comprising:
   a. a housing means connected to a basic support means;
   b. said housing means including a cover head assembly pivotally connected to said basic support means and a receptacle assembly removably connected to said basic support means;
   c. said receptacle assembly having a canister member with an upper opening and an inlet air opening;
   d. a vacuum power means mounted on said canister member to seal around said upper opening by weight of said vacuum power means and suction generated thereby;
   e. said vacuum power means having a filter and motor assembly mounted on a motor head support assembly; and
   f. said filter and motor assembly having a vacuum motor member operable when energized to draw inlet air through said inlet air opening, a portion of said motor member, and discharged through said motor head support assembly.

2. A vacuum apparatus as described in claim 1, wherein:
   a. said vacuum motor member having an upper power section connected to a blower section;
   b. said motor head support assembly having a motor support plate and an air flow control cover secured to said motor support plate;
   c. said motor support plate having an inlet opening;
   d. said vacuum motor member mounted about said inlet opening; and
   e. said air flow control cover is mounted against said blower section to direct air laterally and keep dust particles from said power section of said vacuum motor member.

3. A vacuum apparatus as described in claim 2, wherein:
   a. said vacuum power means having a pair of said vacuum motor members, each mounted about a separate one of said inlet opening; and
   said vacuum motor members operable simultaneously to create substantial vacuum pressure therefrom.

4. A vacuum apparatus as described in claim 1, wherein:
   a. said filter and motor assembly having a pair of said vacuum motor members and a filter assembly connected thereto; and
   b. said filter assembly including an inner filter member, an outer filter member mounted about said inner filter member, and a filter support assembly holding the interconnected said inner filter member and said outer filter member adjacent air inlet areas of said vacuum motor members to filter the air drawn thereto.

5. a vacuum apparatus as described in claim 4, wherein:
   a. said inner filter members constructed of a disposable paper material that can be discarded as needed; and
   b. said outer filter members constructed of a foam material that can be cleansed and re-used as required.

6. A vacuum apparatus as described in claim 5, wherein:
   a. said inner filter members and said outer filter members of cylindrical shape; and
   b. said filter support assembly having a filter support plate to seal against said inner filter members and said outer filter members to direct air through sidewalls thereof for a filtering action.

7. A vacuum apparatus as described in claim 1, including:
   a. a hose assembly connected to said inlet air opening to direct air into said canister member; and
   b. said hose assembly having an elongated hose member with one end connected about said inlet air opening and the other end connected to a nozzle member used for cleansing purposes.

8. A vacuum apparatus as described in claim 1, including:
   a. a coin control means mounted between an inlet power line and said vacuum power means; and
   b. said coin control means having a coin acceptor member connected to said inlet power line to accept a coin and supply electrical power to said vacuum power means for a preselected time period.

9. A vacuum apparatus as described in claim 1, including:
 a. a lock bar assembly connected to said cover head assembly and said basic support means to anchor said receptacle assembly and said cover head assembly in the closed, secured condition.

10. A vacuum apparatus as described in claim 1, wherein:
 a. said motor head support assembly including a motor support plate mounted about said upper opening of said canister member and an air flow cover secured to said motor support plate;
 b. said air flow cover having a motor cover section integral with an outlet air channel section; and
 c. said motor cover section engages and encloses a portion of said vacuum motor member to direct filtered air away from a power section of said vacuum motor member to increase life thereof.

11. A vacuum apparatus as described in claim 10, wherein:
 a. said filter and motor assembly having a pair of said vacuum motor members and a filter assembly connected thereto;
 b. each of said vacuum motor members having one of said power sections connected to a blower section; and
 c. said blower sections enclosed by said motor head support assembly to keep air flow from sid power section.

12. A vacuum apparatus as described in claim 11, wherein:
 a. said filter assembly having an inner filter member, an outer filter member mounted about said inner filter member, and a filter support assembly releasably connecting said inner and outer filter members against said motor support plate to direct air from said canister member through said filter assembly and said blower sections to be discharged through said outlet air channel section.

* * * * *